(12) United States Patent
Schwindt et al.

(10) Patent No.: US 9,552,732 B2
(45) Date of Patent: Jan. 24, 2017

(54) DRIVER ASSISTANCE SYSTEM INCLUDING WARNING SENSING BY VEHICLE SENSOR MOUNTED ON OPPOSITE VEHICLE SIDE

(71) Applicant: Robert Bosch GmbH, Stuttgart (DE)

(72) Inventors: Oliver Schwindt, Novi, MI (US);
Bhavana Chakraborty, Novi, MI (US);
Kevin Buckner, Macomb, MI (US);
James Kim, Royal Oak, MI (US)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 14/243,357

(22) Filed: Apr. 2, 2014

(65) Prior Publication Data
US 2015/0287324 A1   Oct. 8, 2015

(51) Int. Cl.
*G08G 1/16* (2006.01)
*B60W 50/14* (2012.01)

(52) U.S. Cl.
CPC .............. *G08G 1/166* (2013.01); *B60W 50/14* (2013.01); *G08G 1/167* (2013.01); *B60W 2050/143* (2013.01); *B60W 2550/30* (2013.01)

(58) Field of Classification Search
CPC ...... G08G 1/167; G08G 1/166; G08G 1/0965; B60Q 9/008; B60W 30/18163; B60W 2050/143; B60W 2520/10; B60W 2550/30; B60W 2550/306; B60W 2550/308; B60W 30/12; B60W 2420/403; B60W 2420/42; B60W 2550/302; G01S 2013/9378; G01S 2013/9321; B60K 2031/0033; B60K 31/0008; B60R 2021/0006; B60R 2021/0011; B60R 21/0134; B60T 2201/08
(Continued)

(56) References Cited

U.S. PATENT DOCUMENTS 6,119,067 A *  9/2000  Kikuchi ............... G01S 7/4026
                                                 342/158
6,853,311 B2 *  2/2005  Taniguchi ............. B60Q 9/008
                                                 340/426.1
(Continued)

FOREIGN PATENT DOCUMENTS

DE    102008061357    6/2010
DE    102009047264    6/2011
(Continued)

OTHER PUBLICATIONS

International Search Report and Written Opinion for Application No. PCT/EP2015/054116 dated May 18, 2015 (9 pages).

*Primary Examiner* — Fekadeselassie Girma
(74) *Attorney, Agent, or Firm* — Michael Best & Friedrich LLP

(57) ABSTRACT

A driver assistance system senses and provides an indication of an approaching vehicle located sidewardly and rearwardly within an immediately adjacent driving lane to a host vehicle. The system includes left and right rear sensor units proximate rear corners of the host vehicle. The rear sensor units sense vehicles on respective sides and rearwardly of the host vehicle. When either rear sensor unit detects an approaching vehicle within the adjacent lane on the opposite side of the host vehicle therefrom, the rear sensor unit provides an opposite-lane warning signal to the other rear sensor unit. The system includes providing host vehicle driving path information to the rear sensor units for determining the path of the adjacent lanes adjacent to and rearward of the host vehicle. The path information accounts for curves in a roadway. Further, the rear sensor units detect the speed of a closing vehicle. When a left rear sensor unit senses a closing vehicle in the immediately adjacent left lane or obtains an opposite-lane warning signal from a right rear sensor unit, the left rear sensor unit provides a warning
(Continued)

signal to an alarm unit for a vehicle approaching in the left lane. When the right rear sensor unit senses a closing vehicle in the immediately adjacent right lane, or receives an opposite-lane warning signal from the left rear sensor unit, the right rear sensor unit provides a warning signal to the alarm unit.

20 Claims, 5 Drawing Sheets

(58) Field of Classification Search
 USPC .................................................. 340/435, 436
 See application file for complete search history.

(56) References Cited

U.S. PATENT DOCUMENTS

| | | | | |
|---|---|---|---|---|
| 7,552,012 | B2* | 6/2009 | Lehner | G08G 1/167 |
| | | | | 340/435 |
| 7,765,066 | B2 | 7/2010 | Braeuchle et al. | |
| 8,094,000 | B2* | 1/2012 | Suzuki | G01S 13/87 |
| | | | | 340/435 |
| 2004/0090314 | A1* | 5/2004 | Iwamoto | B60Q 1/1469 |
| | | | | 340/425.5 |
| 2005/0131607 | A1* | 6/2005 | Breed | B60N 2/002 |
| | | | | 701/45 |
| 2005/0228588 | A1* | 10/2005 | Braeuchle | B60W 30/095 |
| | | | | 701/301 |
| 2005/0248445 | A1* | 11/2005 | Matsuoka | B60Q 9/008 |
| | | | | 340/435 |
| 2007/0216566 | A1* | 9/2007 | Wood | G01S 13/726 |
| | | | | 342/41 |
| 2008/0046150 | A1* | 2/2008 | Breed | B60R 21/0134 |
| | | | | 701/45 |
| 2009/0140887 | A1* | 6/2009 | Breed | G01C 21/165 |
| | | | | 340/990 |
| 2010/0117812 | A1 | 5/2010 | Laubinger et al. | |
| 2011/0291874 | A1* | 12/2011 | De Mersseman | B60R 21/0134 |
| | | | | 342/70 |
| 2012/0271539 | A1* | 10/2012 | Bald | B60W 50/0097 |
| | | | | 701/300 |
| 2012/0296522 | A1* | 11/2012 | Otuka | G08G 1/167 |
| | | | | 701/41 |
| 2013/0057688 | A1* | 3/2013 | Furukawa | G08G 1/166 |
| | | | | 348/148 |
| 2013/0063257 | A1 | 3/2013 | Schwindt et al. | |
| 2013/0158800 | A1* | 6/2013 | Trageser | G08G 1/167 |
| | | | | 701/41 |
| 2014/0071282 | A1 | 3/2014 | Murad et al. | |
| 2014/0362517 | A1* | 12/2014 | Moock | E05B 73/0082 |
| | | | | 361/679.43 |

FOREIGN PATENT DOCUMENTS

| | | |
|---|---|---|
| GB | 2462698 | 2/2010 |
| WO | 2006122867 | 11/2006 |

\* cited by examiner

DRIVER ASSISTANCE SYSTEM INCLUDING WARNING SENSING BY VEHICLE SENSOR MOUNTED ON OPPOSITE VEHICLE SIDE

BACKGROUND

The present invention relates to vehicle monitoring systems and driver assistance systems. In particular, systems and methods described herein relate to lane change assist (LCA) technologies.

SUMMARY

Lane change assistance (LCA) systems provide a driver with information regarding objects (e.g., vehicles) in adjacent lanes. This information assists the driver in making a safe transition into the adjacent lane. LCA systems, as described below, include a sensor unit mounted to each side of the host vehicle. The sensor of each sensor unit is positioned with a field of view that includes at least one of the adjacent lanes (e.g, the lane immediately to the left of the host vehicle or the lane immediately to the right of the host vehicle). Each sensor unit then provides a closing vehicle warning (CVW) indication or warning when a vehicle is detected in the respective adjacent lane closest thereto. There are, however, certain instances wherein such an arrangement is ineffective—for example, when a road curves or one of the sensors is otherwise obstructed.

Other constructions of an LCA system, as described herein, use two generally horizontally spaced sensors disposed at or adjacent the rear of a host vehicle to determine the presence of an approaching vehicle. More specifically, each sensor determines the presence of an approaching vehicle in an immediately adjacent lane closest thereto and also in the immediately adjacent lane at the other side of the host vehicle (i.e., the lane closest to the other sensor). When the sensor senses an approaching vehicle in the closest lane thereto, a warning is provided to a vehicle operator. When the sensor unit detects an approaching vehicle is in the other adjacent lane (i.e., the lane closest to the other sensor), the sensor unit provides a warning signal to a sensor unit provided with the other sensor. Similarly, the sensor unit is configured to receive a warning signal from the other sensor unit indicating an approaching vehicle in the adjacent lane. The sensor unit controls triggering of an alarm in response to detecting an approaching vehicle in the adjacent lane and also in response to receiving a warning signal from the other sensor unit indicating an approaching vehicle in the adjacent lane.

In one embodiment, an assistance system for providing an approaching vehicle warning for a host vehicle comprises a first rear sensor unit positionable proximate a rear corner of the host vehicle, the first rear sensor unit including an electronic control unit and a sensor. The electronic control unit is configured to: obtain host vehicle driving path information; determine, from the driving path information, an area corresponding to an immediately adjacent lane extending rearwardly from a left side of the host vehicle and an area corresponding to an immediately adjacent lane extending rearwardly from the right side of the host vehicle; detect a closing object in the immediately adjacent lane extending rearwardly from a side of the host vehicle closest to the rear sensor unit, and in response to detecting the closing object, to provide a near-lane warning signal; and detect a closing object in the immediately adjacent lane extending rearwardly from a side of the host vehicle closest to the rear sensor unit, and in response to detecting the closing object, to provide an opposite-lane warning signal.

In another embodiment, the invention provides a method of determining when a closing object in an adjacent lane is approaching a host vehicle by obtaining host vehicle driving path information; determining from the driving path information, locations of immediate adjacent lanes to a left side, a right side and extending rearwardly of the host vehicle; detecting, by a first rear sensor unit positioned proximate to a rear corner of the host vehicle, a closing object in the immediately adjacent lane on a side of the vehicle closest to the first rear sensor unit and providing a near-lane warning signal; and detecting, by the first rear sensor unit, a closing object in the immediately adjacent lane on a side of the host vehicle opposite the first rear sensor unit and providing an opposite-lane warning signal to a second rear sensor unit positioned proximate to a rear corner of the host vehicle opposite the first rear sensor unit.

In another embodiment, the invention provides a driver assistance system for providing a closing object warning for a host vehicle. The system comprises: a right rear sensor unit configured for positioning proximate a right rear corner of the host vehicle, the right rear sensor unit including a right electronic control unit and a right sensor; a left rear sensor unit configured for positioning proximate a left rear corner of the host vehicle, the left rear sensor unit including a left electronic control unit and a left sensor. The left electronic control unit is configured to: obtain host vehicle driving path information; determine from the driving path information locations of immediately adjacent lanes from the left side and right side of the host vehicle and extending rearwardly of the location of the host vehicle; detect distance and speed of objects located rearwardly, leftwardly and rightwardly of the host vehicle with the left sensor; determine a closing object in the adjacent left lane and providing a left lane warning signal; and determine a closing object in the adjacent right lane and providing an opposite-lane warning signal to the right rear sensor unit.

Another embodiment includes an alarm unit for outputting an indication of a closing object in the adjacent left lane in response to the left lane warning signal, and wherein the left rear sensor unit provides the right lane warning signal to the right rear sensor unit. In some embodiments, the right electronic control unit of the right rear sensor unit is also configured to: obtain the host vehicle driving path information; determine from the driving path information an area corresponding to an immediately adjacent lane extending rearwardly from the right side of the host vehicle and an area corresponding to an immediately adjacent lane extending rearwardly from the left side of the host vehicle; detect distance and speed of objects located rearwardly, rightwardly and leftwardly of the host vehicle with the right sensor to determine presence of a closing object; determine a closing object in the adjacent right lane and providing a right lane warning signal; and determine presence of a closing object in the adjacent left lane and providing an opposite-lane warning signal to the left rear sensor unit.

In some embodiments, one of the sensors of the sensor units is unable to sense a closing object in the closest lane when a turning amount causes a sensor output of the sensor to reflect from a guard rail or wall adjacent a roadway. In some instances, the other sensor can sense a vehicle in the lane closest to the first sensor, as the line of sight of the other sensor is not blocked.

In some embodiments, the alarm provides a visual alarm, and when a turn signal is activated for the host vehicle, an audible message is provided indicating that a closing object is located in the immediately adjacent lane corresponding to the lane change selected by the turn signal of the host vehicle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
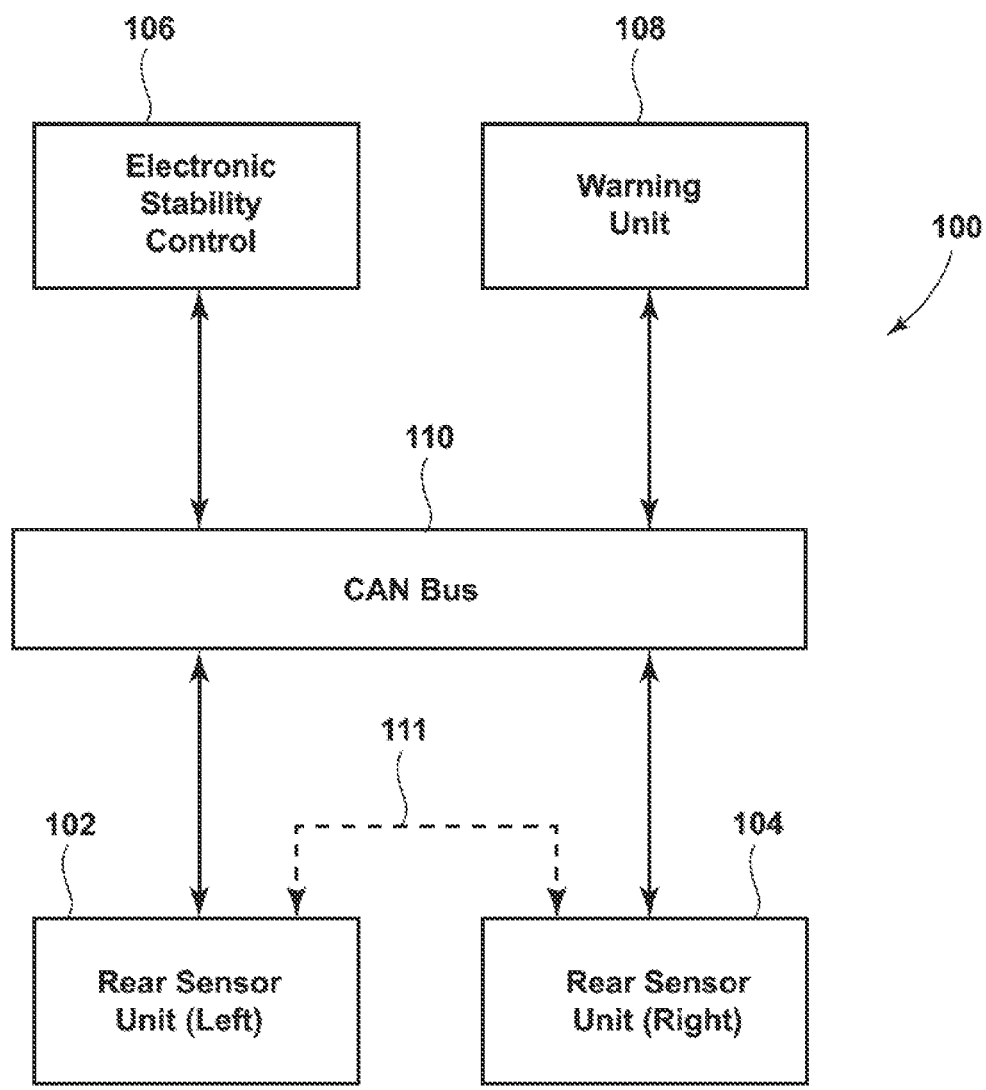
FIG. 1 is a block diagram of a vehicle driver assistance system according to one embodiment

FIG. 1 illustrates a driver's assistance system 100 for a host vehicle such as a four-wheeled car or truck. The system 100 includes a left rear sensor unit 102 and a right rear sensor unit 104. Further, the system includes an electronic stability control unit (ESC) 106 and a warning unit 108. A CAN bus 110 provides communication between the rear sensor units 102, 104, the ESC 106 and the warning actuating unit 108. Various other vehicle subsystems also connect to the CAN bus 110 and communicate with each other. Furthermore, in some other constructions, a direct communication wire shown by broken line 111 in FIG. 1 is provided between the left rear sensor unit 102 and the right rear sensor unit 104 and communication over the CAN bus 110 is not required.

Figure 2:
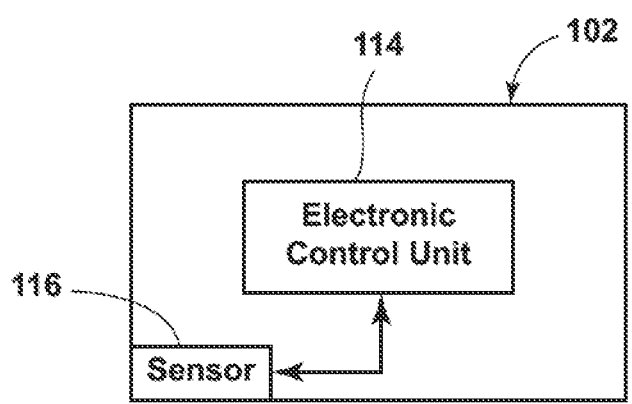
FIG. 2 is a block diagram of a sensor unit of the driver assistance system of FIG. 1.

FIG. 2 is a block diagram of an individual rear sensor unit 102. The rear sensor unit illustrated in FIG. 2 is labeled as the left rear sensor unit 102. However, the right rear sensor unit 104 includes similar components. The rear sensor unit 102 includes an electronic control unit 114 and a sensor 116.

In some constructions, an electronic control unit (ECU) 114 includes a processor that has an executable program stored in a memory module, such as a ROM. The ECU 114 also includes a RAM for storing information from other vehicle units that is received through the CAN bus 110. Non-transitory computer readable memory modules of the ECU 114 include volatile memory, non-volatile memory, or a combination thereof and, in various constructions, may also store operating system software, applications/instructions data, and combinations thereof.

The sensor 116 in the example of FIG. 2 includes a radar sensor. Each radar sensor senses a direction, distance and measures a speed of a closing object to determine that the object is closing in distance to the host vehicle 120. The speed of the closing object is adjusted by the speed of the host vehicle 120 supporting the radar sensors 116. In other constructions, the sensor 116 may include other sensor technologies including, for example, a light detecting and ranging (LIDAR) sensor or a video sensor.

Figure 3:
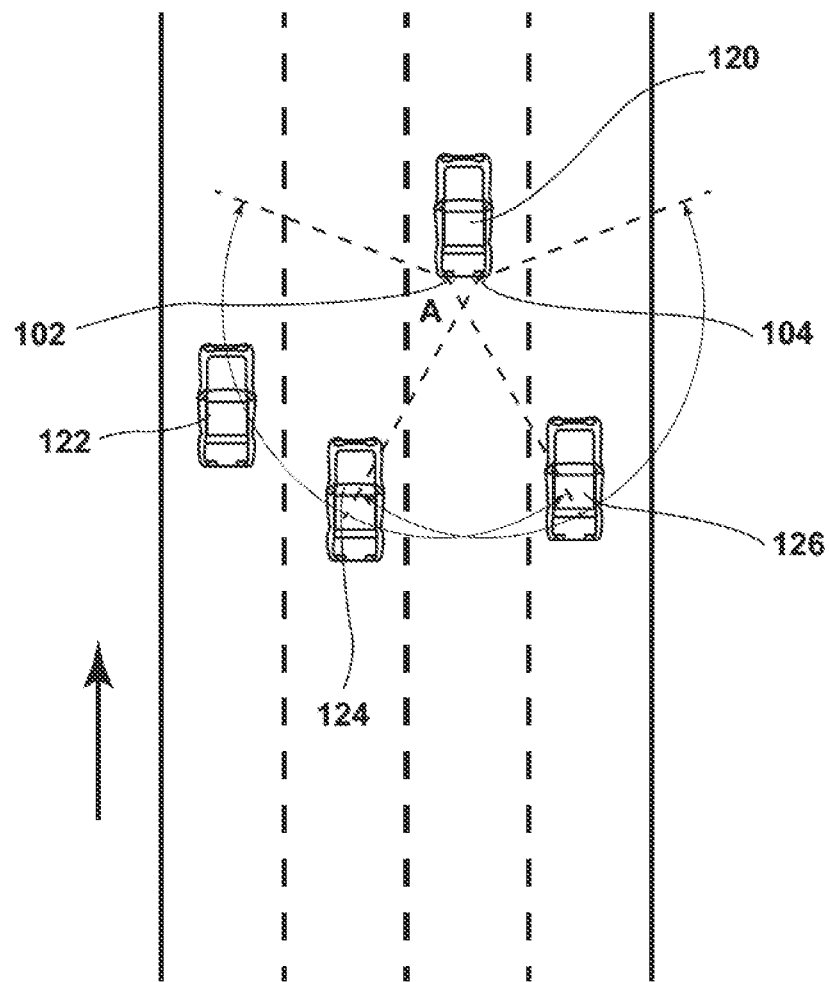
FIG. 3 is an overhead view of a first situational example of a host vehicle equipped with the driver assistance system of FIG. 1 on a multi-lane highway.

FIG. 3 illustrates a vehicle 120 equipped with the driver's assistance system 100. The left rear sensor unit 102 is disposed proximate the left rear edge or corner of the vehicle and the right rear sensor unit 104 disposed proximate the right rear edge or corner of the vehicle. The sensors 116 of each rear sensor unit 102, 104 have a field of view of approximately 150 degrees or less. Each sensor 116 is positioned such that its field of view includes the immediately adjacent lane on its respective side of the vehicle 120 and also the immediately adjacent lane on the opposite side of the vehicle 120. The field of view of each respective sensor 116 is represented in FIG. 3 as a dashed line.

The example of FIG. 3 shows three vehicles located rearward to the host vehicle 120, a vehicle 122 is located two lanes to the left of the host vehicle 120, a vehicle 124 is located one lane to the left of the host vehicle, and a third vehicle 126 is located to the right of the host vehicle. Due to the positioning and field of view of the sensors 116, the left rear sensor unit 102 is able to detect all three vehicles 122, 124, and 126 in its field of view. The right rear sensor unit 104 is able to detect vehicle 126 on its adjacent side of the host vehicle 120 and is also able to detect vehicle 124 in the adjacent lane on the opposite side of the host vehicle 120. However, vehicle 122, which is positioned two lanes to the left of the host vehicle 120, is not detected within the field of view of the right rear sensor unit 104. Also of note, the field of view of each sensor does not cover areas as close to the rear of the host vehicle on the opposite side of the host vehicle as the other sensor does. For instance, the left rear sensor 116 is able to sense objects in a close-in area A near the left rear side of the vehicle. However, the right rear sensor is not capable of detecting objects in area A (as shown in FIG. 3 by the broken lines defining a field of view for each of the sensors).

Figure 4:
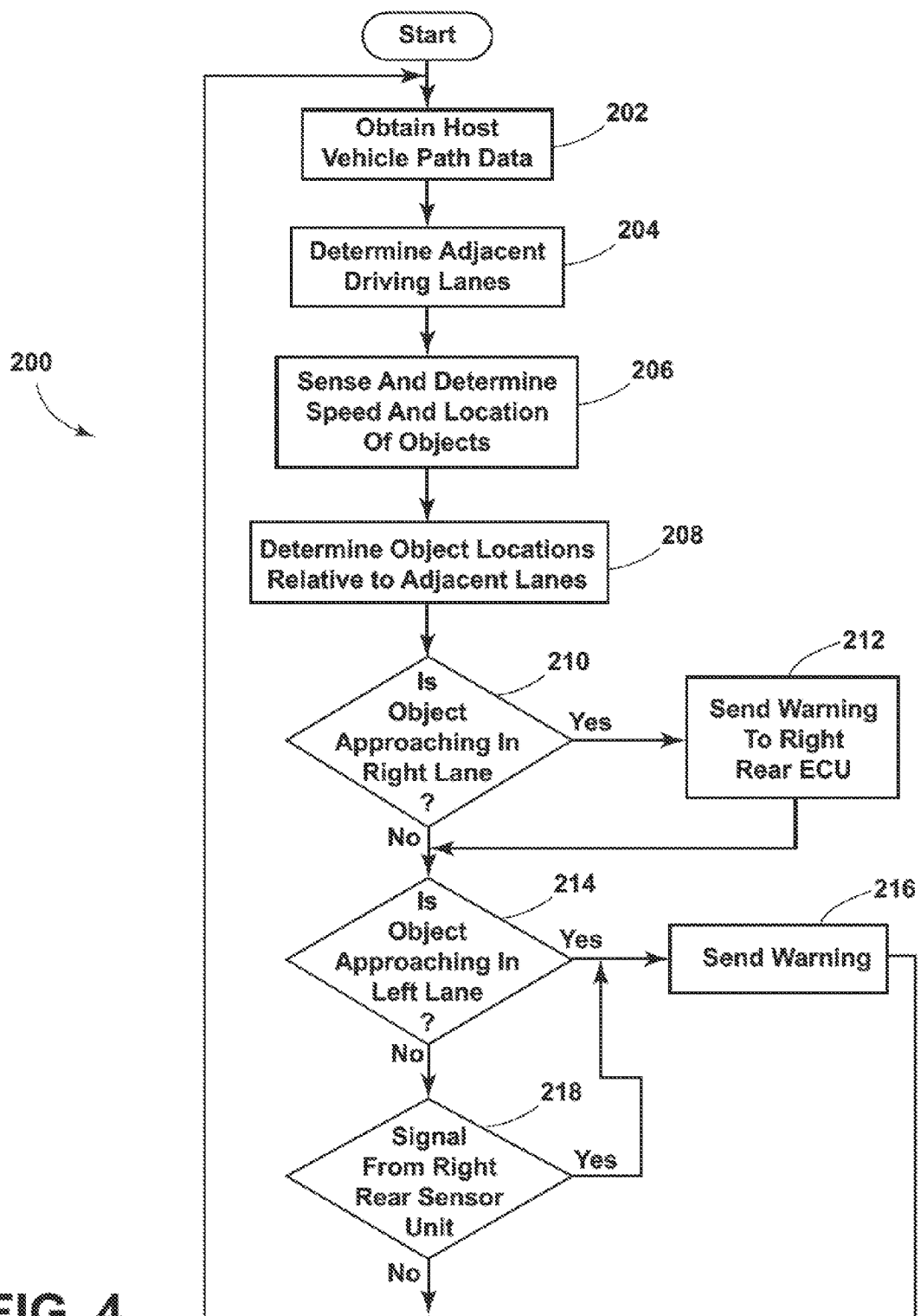
FIG. 4 is a flowchart of a method of determining closing vehicle warning conditions using the driver assistance system of FIG. 1.

FIG. 4 is a flowchart 200 illustrating one method in which a single sensor unit of the driver's assistance system 100 of FIG. 1 monitors for vehicles in the adjacent lanes and alerts the driver to a closing or fast approaching vehicle from the rear located in an immediately adjacent lane. In the example of FIG. 4, each rear sensor unit operates independently of the other rear sensor unit. As such, although FIG. 4 refers specifically to the operation of an electronic control unit (ECU) 114 of the left rear sensor unit 102, the right rear sensor unit 104 operates in essentially the same manner. The steps shown in FIG. 4 are for purposes of illustration, and thus the order of the steps can be changed in many instances while having no effect on execution of the program by the ECU 114.

The ECU 114 obtains host vehicle path driving data or information (step 202) from the electronic stability control unit ESC 106 and other data devices. The ESC 106 (and in some embodiments the airbag unit) deliver a yaw-rate signal, which is the rate of change of the yaw angle of the vehicle. By integrating the yaw-rate signal with time, change in the yaw angle can be determined. Further, the ESC 106 delivers the host vehicle velocity to the ECU 114. By integrating vehicle velocity with time, the ECU 114 determines the driven distance. Thus, the ECU 114 determines a driven path for the host vehicle from the yaw angle and the host vehicle velocity. The middle of immediately adjacent neighboring lanes are a lane width away perpendicularly or sideward from the driven path. Based on the obtained vehicle path data or information, the ECU 114 is able to determine the location of the immediately adjacent driving lanes (step 204) sidewardly and rearwardly from the current position of the host vehicle. The ECU 114 receives data from the sensor 116 and determines the presence and relative velocity (or speed) of objects sidewardly and rearwardly of the vehicle (step 206).

The ECU 114 compares the sensor data with the determined location of the immediately adjacent lanes (step 208). Based on this comparison, the ECU 114 of the left rear sensor unit 102 determines whether any approaching vehicle is located in the immediate right lane closest to right rear sensor unit 104 and is approaching at a closing speed resulting in a possible collision if the host vehicle 120 changes lanes (step 210). If so, the left rear sensor unit 102 sends an opposite-lane warning signal to the right rear sensor unit 104 (step 212) for processing thereby. In this example, the signal transmitted from the left rear sensor unit 102 over the CAN bus 110 to the right rear sensor unit 104 is a binary (i.e., YES/NO) signal as to whether there is a vehicle approaching in the adjacent right lane (step 212). However, in some other constructions, the signal may include different warning states depending, for example, on the speed of the approaching closing vehicle in the adjacent right lane. It is noted that, in this example, the amount of information transmitted over the CAN bus 110 by the rear sensor units 104, 106, does not transmit actual sensor data to the other sensor unit. Instead, the sensor data is processed by the respective rear sensor unit and a much smaller signal is transmitted on the CAN bus 110 to the other rear sensor unit.

After sending the signal to the right rear sensor unit 104, the ECU 114 determines whether an object is located in the immediate left lane and operating at a closing speed and thus approaching the host vehicle 120 (step 214). As shown in FIG. 4, even if no approaching object is detected in the immediate right lane the program advances to step 214.

When an approaching object in the immediate left lane is detected (step 214), the ECU 114 actuates a warning (step 216). A warning is generated by sending a warning signal to the warning unit 108. The warning unit 108 outputs a visual warning to a display on the host vehicle 120 indicating a vehicle approaching from the immediate left lane and rearwardly of the host vehicle. In some constructions, the ECU 114 of the left rear sensor unit transmits data to the warning unit 108 indicative of a distance or time until collision with the approaching vehicle. In some constructions, the warning provided by the warning unit 108 is a chime or an audible message.

The ECU 114 also monitors for incoming warning signals output by the right rear sensor unit 104 indicating an approaching object in the immediate left lane. When a YES signal is received, the ECU 114 actuates a warning as described above (step 216). Whether or not a warning is generated, the ECU 114 again obtains host vehicle path data (step 202) and the routine is repeated.

The use of the left rear sensor unit 102 to detect an object closing in on the host vehicle in the immediately adjacent left lane and providing a signal indicative of such to the right rear sensor unit 104 is not simply redundant. The situations illustrated in FIGS. 3 and 5 illustrate how this overlapping mechanism can provide important driver assistance information in situations where a rear sensor is not able to detect approaching vehicles.

As discussed above, in the example of FIG. 3, the right rear sensor 104 is able to detect the approaching vehicle 126 in the adjacent right lane and is also able to detect the approaching vehicle 124 in the adjacent left lane. Similarly, the left rear sensor 102 is also able to detect the approaching vehicles 124, 126 in both adjacent lanes.

Figure 5:
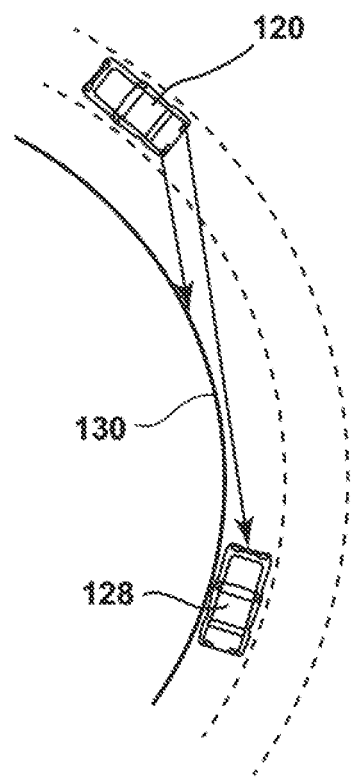
FIG. 5 is an overhead view of a situational example of the host vehicle equipped wherein the left rear sensor unit is unable to detect a vehicle in an adjacent left lane.

In contrast, FIG. 5 illustrates a situation wherein the right rear sensor unit 104 detects an approaching object in the left adjacent lane that cannot be sensed by the left rear sensor unit 102. In the example of FIG. 5, the host vehicle 120 is driving along a tight or sharp leftward curve. Vehicle 128 in the adjacent left lane is not detectable by the left rear sensor unit 102 due to a barrier 130 that blocks the radar signal output by the left rear sensor unit 102. In this example, the barrier 130 obstructing the field of view of the left rear sensor 102 is a guard rail. However, the field of view of either rear sensor unit can similarly be obstructed by mud, ice or snow on the road surface or accumulated over the sensor itself. Furthermore, in some conditions, a guard rail or other object may reflect light such that a radar signal reflection is inaccurate. In such cases, the warning signal generated by and received from the rear sensor unit on the opposite side of the host vehicle is able to provide warning information that would have otherwise gone undetected.

In the examples described above, the ECU 114 sends a warning signal to the warning unit 108 (or to the other rear sensor unit) when an approaching vehicle is detected in the immediately adjacent lane. However, in some constructions, other situational conditions or actions by the driver can influence the behavior of the warning unit 108. For example, in some constructions an audible message is provided only when a turn signal is activated for the host vehicle 120 and a closing object is sensed in the immediately adjacent lane corresponding to the lane change indicated by the turn signal of the host vehicle. When the turn signal is not operated, only a visual warning, for example output by light emitting diodes, is provided.

Thus, the invention provides, among other things, systems and methods to monitor and indicate approaching vehicles in immediately adjacent lanes from a host vehicle. Furthermore, although the example above describes one arrangement for sensing and warning a driver of a closing vehicle, other constructions of this invention can utilize different arrangements. Various features and advantages of the invention are set forth in the following claims.

What is claimed is:

1. An assistance system for providing an approaching vehicle warning for a host vehicle, the system comprising:
   a first rear sensor unit positionable proximate to a rear corner of the host vehicle, the first rear sensor unit including an electronic control unit and a sensor, the electronic control unit configured to:
   obtain host vehicle driving path information;
   determine, from the driving path information, an area corresponding to an immediately adjacent lane extending rearwardly from a left side of the host vehicle and an area corresponding to an immediately adjacent lane extending rearwardly from the right side of the host vehicle;
   detect a closing object in the immediately adjacent lane extending rearwardly from a side of the host vehicle closest to the first rear sensor unit and, in response to detecting the closing object, provide a near-lane warning signal; and
   detect a closing object in the immediately adjacent lane extending rearwardly from a side of the host vehicle opposite the first rear sensor unit and, in response to detecting the closing object, directly communicate from the first rear sensor unit through a direct communication wire to a second rear sensor unit positionable proximate to a rear corner of the host vehicle opposite the first rear sensor unit to provide an opposite-lane warning.

2. The system of claim 1, wherein the first rear sensor unit comprises a left rear sensor unit positionable proximate the left rear corner of the host vehicle, the electronic control unit comprises a left electronic control unit and the sensor comprises a left sensor, wherein the second rear sensor unit comprises a right rear sensor unit positionable proximate to the right rear corner of the host vehicle, the right rear sensor unit including a right electronic control unit and a right sensor, the right electronic control unit configured to:
  obtain vehicle driving path information;
  determine from the driving path information, an area corresponding to an immediately adjacent lane extending rearwardly from the left side of the host vehicle and an area corresponding to an immediately adjacent lane extending rearwardly from the right side of the host vehicle;
  detect a closing object in the immediately adjacent right lane and providing a near-lane warning signal; and
  detect a closing object in the immediately adjacent left lane and providing an opposite-lane warning signal to the left rear sensor unit.

3. The systems of claim 2, further comprising an alarm unit providing a visual alarm in response to the near-lane warning signal of the left rear sensor and the near-lane warning signal of the right rear sensor unit.

4. The system of claim 3, wherein the alarm unit provides the visual alarm, and when a turn signal is activated for the host vehicle, an audible message for a closing object sensed in the immediately adjacent lane corresponding to the lane change selected by the turn signal of the host vehicle.

5. The system of claim 1, including an alarm unit that, in response to a near lane warning signal, outputs at least one from a group of a distance to collision and a time to collision, wherein the distance to collision and the time to collision comprise audible messages.

6. The system of claim 1, including an electronic stability control unit of the host vehicle for providing the driving path information to the electronic control unit, the driving path information comprising a yaw-rate signal and host vehicle velocity.

7. An assistance system for providing an approaching vehicle warning for a host vehicle, the system comprising:
  a first rear sensor unit positionable proximate to a rear corner of the host vehicle, the first rear sensor unit including an electronic control unit and a sensor, the electronic control unit configured to:
    obtain host vehicle driving path information;
    determine, from the driving path information, an area corresponding to an immediately adjacent lane extending rearwardly from a left side of the host vehicle and an area corresponding to an immediately adjacent lane extending rearwardly from the right side of the host vehicle;
    detect a closing object in the immediately adjacent lane extending rearwardly from a side of the host vehicle closest to the first rear sensor unit and, in response to detecting the closing object, provide a near-lane warning signal;
    detect a closing object in the immediately adjacent lane extending rearwardly from a side of the host vehicle opposite the first rear sensor unit and, in response to detecting the closing object, providing an opposite-lane warning signal to a second rear sensor unit positionable proximate to a rear corner of the host vehicle opposite the first rear sensor unit; and
    receive an opposite-lane warning signal from the second rear sensor unit, and wherein when the first rear sensor unit is not providing a near-lane warning signal, the electronic control unit of the first rear sensor unit transmits a near-lane warning signal to a warning unit in response to the received opposite-lane warning signal from the second rear sensor unit.

8. A method of determining when a closing object in an adjacent lane is approaching a host vehicle, the method comprising:
  obtaining, by an electronic control unit, host vehicle driving path information;
  determining from the driving path information, locations of immediately adjacent lanes to a left side, a right side and extending rearwardly of the host vehicle;
  detecting, by a first rear sensor unit positioned proximate to a rear corner of the host vehicle, a closing object in the immediately adjacent lane on a side of the host vehicle closest to the first rear sensor unit and providing a near-lane warning signal; and
  detecting, by the first rear sensor unit, a closing object in the immediately adjacent lane on a side of the host vehicle opposite the first rear sensor unit and directly communicating from the first rear sensor unit through a direct communication wire to a second rear sensor unit positioned proximate to a rear corner of the host vehicle opposite the first rear sensor unit to provide an opposite lane warning signal.

9. The method of claim 8, including the step of visually indicating a closing object in the immediately adjacent lanes to the left side, the right side and extending rearwardly of the host vehicle.

10. The method of claim 8, wherein the first rear sensor unit comprises a left rear sensor unit positionable proximate the left corner of the host vehicle, the electronic control unit comprises a left electronic control unit and the first rear sensor unit comprises a left sensor, and wherein the second rear sensor unit comprises a right rear sensor unit positionable proximate the right rear corner of the host vehicle, the second rear sensor unit comprising a right electronic control unit and a right sensor, the method further comprising:
  obtaining, by the right electronic control unit, driving path information;
  determining from the driving path information, locations of immediately adjacent lanes to the left side, the right side and extending rearwardly of the host vehicle;
  detecting, by the right rear sensor unit, a closing object in the immediately adjacent left lane and providing an opposite-lane warning signal to the left rear sensor unit; and
  detecting, by the right rear sensor unit, a closing object in the immediately adjacent right lane and providing a near-lane warning signal.

11. The method of claim 10, including the steps of:
  providing at least one of a visual and audible warning for a closing object in the immediately adjacent right lane to the host vehicle in response to the right electronic control unit providing the near-lane warning signal; and
  providing at least one of a visual and audible warning for a closing object in the immediately adjacent left lane in response to the left electronic control unit providing the near-lane warning signal.

12. A driver assistance system for providing a closing object warning for a host vehicle, the system comprising:
  a right rear sensor unit configured for positioning proximate a right rear corner of the host vehicle, the right rear sensor unit including a right electronic control unit and a right sensor;

a left rear sensor unit configured for positioning proximate a left rear corner of the host vehicle, the left rear sensor unit including a left electronic control unit and a left sensor, the left electronic control unit configured to:
  obtain host vehicle driving path information;
  determine, from the driving path information, an area corresponding to an immediately adjacent lane extending rearwardly from a left side of the host vehicle and an area corresponding to an immediately adjacent lane extending rearwardly from the right side of the host vehicle;
  detect distance and speed of objects located rearwardly, leftwardly and rightwardly of the host vehicle with the left sensor;
  determine a closing object in the adjacent left lane and providing a left lane warning signal; and
  determine a closing object in the adjacent right lane and directly communicate from the left rear sensor unit through a direct communication wire to the right rear sensor unit an opposite lane warning signal.

13. The system of claim 12, including an electronic stability control unit of the host vehicle for providing the host vehicle driving path information to the left electronic control unit, the driving path information comprising a yaw-rate signal and host vehicle velocity.

14. The system of claim 12, including an alarm unit in communication with the left rear sensor unit for outputting an indication of a closing object in the immediately adjacent left lane in response to the left lane warning signal.

15. The system of claim 14, wherein the right electronic control unit of the right rear sensor unit is configured to:
  obtain the host vehicle driving path information;
  determine, from the driving path information, an area corresponding to an immediately adjacent lane extending rearwardly from a right side of the host vehicle and an area corresponding to an immediately adjacent lane extending rearwardly from the left side of the host vehicle;
  detect distance and speed of objects located rearwardly, rightwardly and leftwardly of the host vehicle with the right rear sensor to determine presence of a closing object;
  determine a closing object in the adjacent right lane and providing a right lane warning signal; and
  determine a closing object in the adjacent left lane and providing an opposite-lane warning signal to the left rear sensor unit.

16. The system of claim 15, wherein when the left sensor is unable to sense a closing object as a turning amount of the host vehicle causes a sensor output of the left sensor to reflect from a guard rail or wall adjacent a roadway, and the right rear sensor unit detects a closing vehicle and provides the opposite-lane warning signal to the left rear sensor unit, and wherein the left rear sensor unit outputs a left lane warning signal to a warning unit.

17. The system of claim 14, wherein the alarm unit provides a visual alarm in response to the left lane warning signal to indicate a closing object in the immediately adjacent left lane, and when a left turn signal is activated for the host vehicle, the alarm unit provides an audible message for a closing object sensed in the immediately adjacent left lane.

18. The system of claim 12, wherein a direct communication wire provides direct communication between the left rear sensor unit and the right rear sensor unit.

19. The system of claim 12, including an alarm unit that, in response to a left lane warning signal or a right lane warning signal, outputs at least one from a group of a distance to collision and a time to collision, wherein the distance to collision and the time to collision comprise audible messages.

20. The system of claim 12, wherein the left sensor and the right sensor comprise radar sensors that sense distance and measure speed of a closing object to determine that the object is closing in distance to the host vehicle.

* * * * *